United States Patent [19]

Higashi

[11] Patent Number: 5,085,247
[45] Date of Patent: Feb. 4, 1992

[54] MACHINING FLUID SUPPLY DEVICE FOR A WIRE CUT ELECTRIC DISCHARGE MACHINE

[75] Inventor: Izumi Higashi, Yamanashi, Japan
[73] Assignee: Fanuc Ltd., Minamitsuru, Japan
[21] Appl. No.: 536,555
[22] PCT Filed: Dec. 5, 1989
[86] PCT No.: PCT/JP89/01220
    § 371 Date: Jul. 10, 1990
    § 102(e) Date: Jul. 10, 1990
[87] PCT Pub. No.: WO90/06202
    PCT Pub. Date: Jun. 14, 1990

[30] Foreign Application Priority Data

Dec. 10, 1988 [JP] Japan .................. 63-311010

[51] Int. Cl.⁵ .................................. B23H 7/36
[52] U.S. Cl. ..................... 137/601; 219/69.12
[58] Field of Search ........... 219/69.12, 69.14, 69.17; 137/599, 601

[56] References Cited

U.S. PATENT DOCUMENTS

| 3,454,737 | 7/1969 | Pfau et al. ............... 219/69.14 |
| 4,191,215 | 3/1980 | Gonner ................... 137/599 X |
| 4,740,667 | 4/1988 | Obara .................... 219/69.14 X |
| 4,868,363 | 9/1989 | Aso et al. ............... 137/601 X |

FOREIGN PATENT DOCUMENTS

| 224787 | 7/1985 | German Democratic Rep. ................ 219/69.14 |
| 205236 | 11/1984 | Japan .................... 219/69.14 |

Primary Examiner—Stephen M. Hepperle
Attorney, Agent, or Firm—Staas & Halsey

[57] ABSTRACT

A machining fluid device for a wire cut electric discharge machine, which controls the amount of machining fluid supplied from upper and lower nozzles to values suited to different machining modes including first and second machining modes. The device includes a machining fluid supply source having first and second supply lines connected to the upper nozzle and third and fourth supply lines connected to the lower nozzle. Selector means selectively permit supply of machining fluid through the first to fourth supply lines. In the first machining mode, the machining fluid is supplied from the upper and lower nozzles through the first and third supply lines at flow rates suited to the first machining mode and in the second machining mode, the machining fluid is supplied through the second and fourth supply lines at flow rates suited to the second machining mode.

7 Claims, 2 Drawing Sheets

MACHINING FLUID SUPPLY DEVICE FOR A WIRE CUT ELECTRIC DISCHARGE MACHINE

TECHNICAL FIELD

The present invention relates to a machining fluid supply device for a wire cut electric discharge machine, capable of easily controlling the amount of machining fluid supplied from upper and lower nozzles, respectively, to values suited to different machining modes.

BACKGROUND ART

Wire cut electric discharge machines are generally provided with a machining fluid supply device which has a machining fluid supply source including a pressure pump, etc., so as to supply machining fluids from upper and lower nozzles, respectively connected to the supply device and arranged above and below a workpiece, to a gap between the workpiece and a wire electrode, to thereby cool the workpiece and the wire electrode and remove sludge from the gap, and further to maintain the workpiece and the wire electrode in a suitably insulated state. The amount of the machining fluid discharged from the pressure pump is controlled in a multi-stage fashion in accordance with the values of various machining parameters such as wire feed speed, thickness of the workpiece, diameter of the wire, etc. The amount of machining fluid supplied varies in accordance with the parameter values.

In wire cut electric discharge machines, electric discharge machining is performed in either of two machining modes, i.e., a cut-out operation mode for cutting a semi-finished product of a desired shape out of a workpiece or cutting a portion of a desired shape out of a workpiece or semi-finished product, and a face machining mode for, e.g., finishing the cut surfaces of a workpiece or semi-finished product after a cut-out operation. To control the amount of the machining fluid supplied from the upper and lower nozzles to values suited to the different machining modes, a conventional machining fluid supply device comprises first and second flow regulating valves which are disposed in first and second pipes respectively connecting the upper and lower nozzles to the pressure pump, and the openings of these two flow regulating valves are manually adjusted to different values, depending on whether the cut-out operation or face machining is to be carried out. It is, however, very troublesome to carry out a manual adjustment every time the machining mode is switched from cut-out operation to face machining or vice versa. Further, where both a cut-out operation and face machining are involved, unmanned operation of the electric discharge machine is not available because the flow rates of the machining fluids must be manually adjusted.

DISCLOSURE OF THE INVENTION

An object of the present invention is to provide a machining fluid supply device for a wire cut electric discharge machine, which is capable of easily controlling the amount of machining fluid supplied from upper and lower nozzles, to values suited to different machining modes.

To achieve the above-mentioned object, there is provided a machining fluid supply device for use with a wire cut electric discharge machine having upper and lower nozzles and adapted to carry out an electric discharge machining in a desired one of a plurality of machining modes which include first and second machining modes. The machining fluid supply device comprises a machining fluid supply source, first and second supply lines respectively interposed between the machining fluid supply source and the upper nozzle, third and fourth supply lines respectively interposed between the machining fluid supply source and the lower nozzle, and selector means for selectively permitting supply of machining fluids through the first to fourth supply lines. In the first machining mode, the machining fluids are supplied from the upper and lower nozzles through the first and third supply lines at flow rates suited to the first machining mode, and in the second machining mode, the machining fluids are supplied through the second and fourth supply lines at flow rates suited to the second machining mode.

Preferably, the machining fluid supply device comprises control means for controlling the selector means.

As described above, according to the present invention, two supply lines that permit the machining fluid to be supplied from the upper and lower nozzles at flow rates suited to the machining mode are selected from among the plurality of supply lines which are interposed between the machining fluid supply source and the upper and lower nozzles, simply by operating the selector means, so that a suitable amount of the machining fluid supplied from the upper and lower nozzles is ensured. This makes it easy to perform an adjustment of the amount of the machining fluid which is needed when a shift is made between the different machining modes. Preferably, control means for controlling the selector means are provided, whereby no manual adjustment is required, and accordingly, unmanned operation of the wire cut electric discharge machine can be carried out.

Best Mode of Carrying Out the Invention

Figure 1:
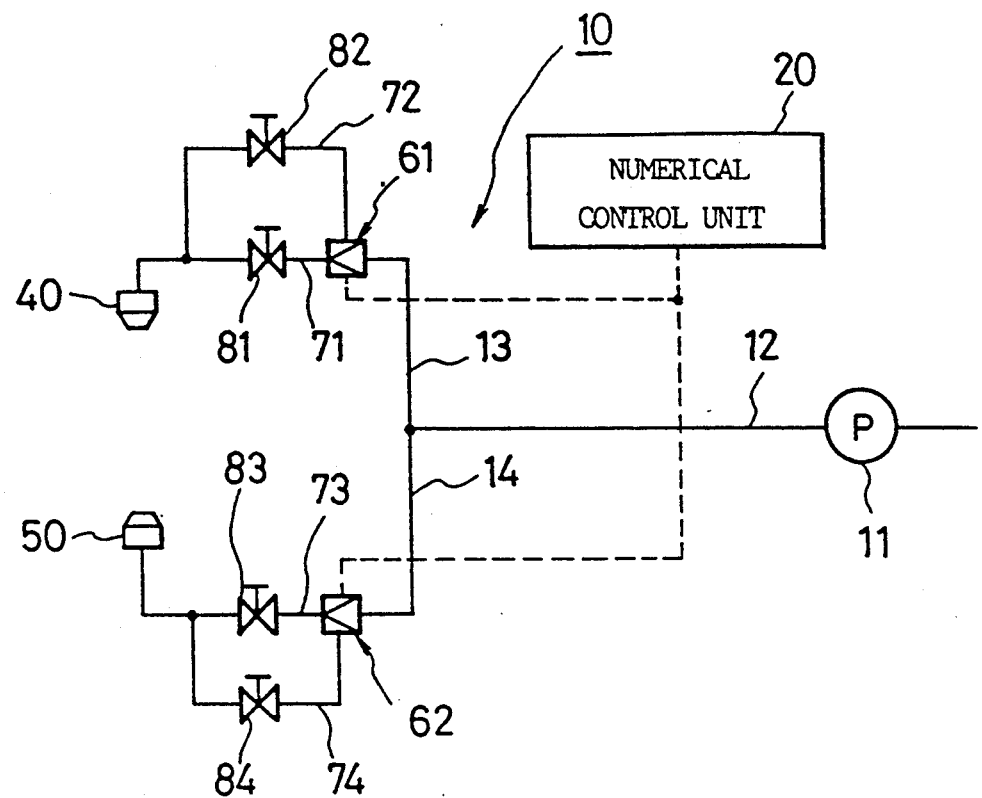
FIG. 1 is a schematic diagram showing a principal part of a wire cut electric discharge machine provided with a machining fluid supply device according to a first embodiment of the present invention.
Figure 2:
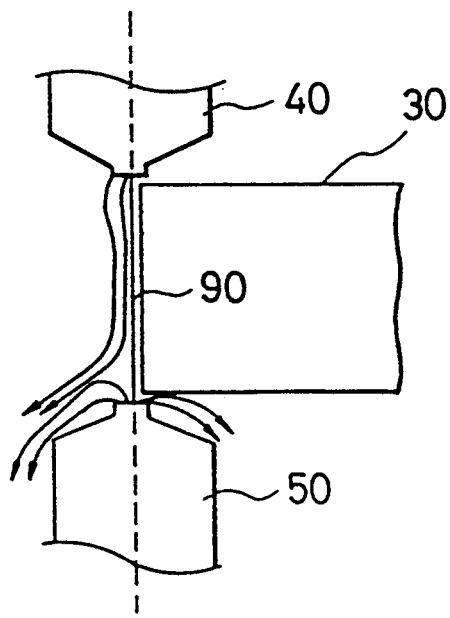
FIG. 2 is a diagram illustrating supply of a machining fluid by the machining fluid supply device of FIG. 1 during face machining.

With reference to FIGS. 1 and 2, a wire cut electric discharge machine provided with a machining fluid supply device according to a first embodiment of the present invention will be explained.

The wire cut electric discharge machine comprises a machining fluid supply device 10, a numerical control unit 20 arranged to control various operations of the electric discharge machine and serving as a control unit for the machining fluid supply device 10, and an upper nozzle 40 and a lower nozzle 50 respectively disposed above and below a workpiece 30. The electric discharge machine is arranged to perform electric discharge machining in a desired one of either a cut-out operation mode or a face machining mode, and make an adjustment of the maounts of the machining fluid supplied from the upper and lower nozzles 40, 50 in such a manner that suitability of the machining fluid supply amounts for the selected machining mode is ensured.

The machining fluid supply device 10 comprises a pump 11 which cooperates with a machining fluid tank, a machining fluid purifying device, and a device for adjusting the specific resistance of the machining fluid (none of which are shown) to form a machining fluid supply source. The pump 11 has a discharge port connected to one end of a main pipe 12 whose downstream side is branched off into a pipe 13 for the upper nozzle and a pipe 14 for the lower nozzle. The downstream side ends of the pipes 13, 14 are respectively connected to inlet ports of first and second three-way selector valves 61 and 62 each of which is comprised of an electromagnetic valve and connected to the numerical control unit 20.

First and second outlet ports of the first three-way selector valve 61 are connected to respective one ends of first and second auxiliary pipes 71 and 72, which are connected at the other end to the upper nozzle 40. First and second manually-operated flow regulating valves 81 and 82, each having a flowmeter, are disposed in the first and second auxiliary pipes 71 and 72, respectively. Similarly, third and fourth auxiliary pipes 73 and 74, which are respectively connected at their one ends to first and second outlet ports of the second three-way selector valve 62, have their other ends respectively connected to the lower nozzle 50, and third and fourth manually-operated flow regulating valves 83 and 84 each having a flowmeter are respectively disposed in the auxiliary pipes 73, 74. The first to fourth auxiliary pipes 71-74 have substantially the same inner diameter.

The operation of the wire cut electric discharge machine constructed as above will be now explained.

Before starting the operation of the electric discharge machine, an operator first adjusts the valve opening of the first regulating valve 81 such that the flow rate of the machining fluid through the first auxiliary pipe 71 is suited to the cut-out operation, as well as to the values of various machining parameters such as the thickness of the workpiece 30, the machining speed, etc. The operator also adjusts the valve opening of the third regulating valve 83 so as to be substantially equal to that of the first regulating valve 81. Next, the valve opening of the second regulating valve 82 is adjusted such that the flow rate of the machining fluid through the second auxiliary pipe 72 is suited to the face machining and to the various machining parameter values. Further, the fourth regulating valve 84 is adjusted such that the valve opening thereof is about 10% to 15% of the opening of third regulating valve 83.

After the operation of the electric discharge machine is started, the numerical control unit 20 controls various operating sections of the electric discharge machine in accordance with a machining program installed therein, in a conventional manner. For example, to carry out the cut-out operation, a worktable (not shown) is horizontally driven such that a machining initial hole (not shown) bored through the workpiece 30 is aligned with the upper and lower nozzles 40 and 50, and then a wire extension is effected to cause a wire electrode 90 to pass through the machining initial hole, under the control of the numerical control unit 20. Subsequently, electric discharge machining is started.

In relation to the present invention, when it is determined on the basis of the machining program that the cut-out operation mode is to be entered, the numerical control unit 20 controls the first and second three-way selector valves 61, 62 such that the inlet ports thereof are communicated with their respective first outlet ports, and also drives the pump 11. As a result, a pressurized machining fluid discharged from the pump 11 to the main pipe 12 is supplied to the upper nozzle 40 through the first selector valve 61 and the first auxiliary pipe 71, and also to the lower nozzle 50 through the second selector valve 62 and the third auxiliary pipe 73. The machining fluid thus supplied is injected to a gap between the workpiece 30 and the wire electrode 90 from the upper and lower nozzles 40, 50.

In this case, since the openings of the first and third flow regulating valves 81, 83 arranged in the first and third auxiliary pipes 71, 73 are respectively adjusted beforehand as mentioned above, the machining fluids are injected from the upper and lower nozzles 40, 50 at flow rates (e.g., 8 lit. per min.) substantially equal to each other and suited to the cut-out operation and to the values of the various machining parameters for the cut-out operation. Consequently, the machining fluid having a high pressure (e.g., 15 to 16 atm.) is supplied to the gap between the workpiece 30 and the wire electrode 90. At this time, the wire electrode 90 is located in an elongated groove formed in the workpiece 30 by the cut-out operation and opening in the upper and lower surfaces of the workpiece. The pressures of the machining fluids, respectively injected from the upper and lower nozzles 40, 50 toward the groove, act downwardly and upwardly, respectively, and cancel out each other. As a consequence, the machining operation is by no means hindered by the supply of the high-pressure machining fluid. For example, no vibration sufficient to cause a disconnection of the wire electrode 90 is produced in the electrode 90.

If after completion of the cut-out operation, it is determined on the basis of the machining program that the face machining mode is to be entered for finishing the machined surfaces to which the cut-out operation has been subjected, the numerical control unit 20 controls the first and second three-way selector valves 61, 62 such that the inlet ports thereof are communicated with their respective second outlet ports. As a result, the pressurized machining fluid discharged from the pump 11 to the main pipe 12 is supplied to the upper nozzle 40 through the first selector valve 61 and the second auxiliary pipe 72, and to the lower nozzle 50 through the second selector valve 62 and the fourth auxiliary pipe 74.

In this case, since the valve openings of the second and fourth flow regulating valves 82, 84 arranged in the second and fourth auxiliary pipes 72, 74 are respectively adjusted beforehand to the aforesaid openings, the machining fluid is injected from the upper nozzle 40 at a flow rate (e.g., 0.5 to 2 lit. per min.) suited to the face finishing operation and to the various machining parameter values for the face finish, while the machining fluid is supplied from the lower nozzle 50 at a flow rate equal to about 10% to 15% of the flow rate of the machining fluid through the upper nozzle 40. As a consequence, the surface of the workpiece 30 to be machined and the wire electrode 90 are supplied with the machining fluid substantially only from the upper nozzle 40, along the surface of the workpiece 30 and the wire electrode 90, as shown in FIG. 2. Since the machining fluid is discharged also from the lower nozzle 50, sludge contained in the machining fluid can be prevented from entering the lower nozzle 50. Further, the machining fluid from the lower nozzle 50, along with that from the upper nozzle 40, serves to cool the bottom portion of the workpiece 30, a work support table (not shown), and their peripheral parts, whereby temperature fluctuations of the workpiece 30, the work support table, etc. are reduced and thus deterioration in the machining precision is eliminated.

Figure 3:
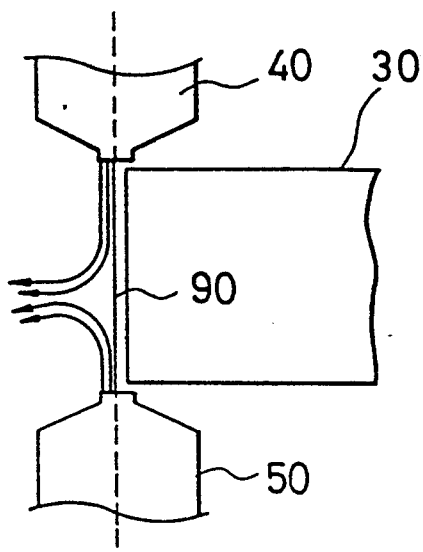
FIG. 3 is a diagram illustrating supply of the machining fluids from upper and lower nozzles at equal flow rates.

If, during the face machining operation, the machining fluids are injected from the upper and lower nozzles 40, 50 at equal flow rates, unlike the aforesaid case, the jets of the machining fluid from the two nozzles collide with each other at a region close to a central portion of the machined surface in the thickness direction of the workpiece, as shown in FIG. 3. In such a case, part of the pressurized machining fluid flows horizontally toward the surface being machined, and the machining fluid that has struck against the surface flows away from it. As a result, the wire electrode 90 vibrates and the supply amount of the machining fluid fluctuates, thus lowering the machining precision and even causing a disconnection of the wire electrode 90. These disadvantages are eliminated by the device of this embodiment, because injection of the machining fluid along the surface being machined and the wire electrode 90 is effected substantially only by the upper nozzle 40.

A machining fluid supply device according to a second embodiment of the present invention will be described with reference to FIG. 4.

As compared with the device of the aforesaid first embodiment, the device of the second embodiment differs therefrom chiefly in that a single three-way selector valve 60 is employed instead of the first and second three-way selector valves 61, 62. In FIG. 4, identical or similar reference numerals are used to denote identical or similar elements in FIG. 1.

Figure 4:
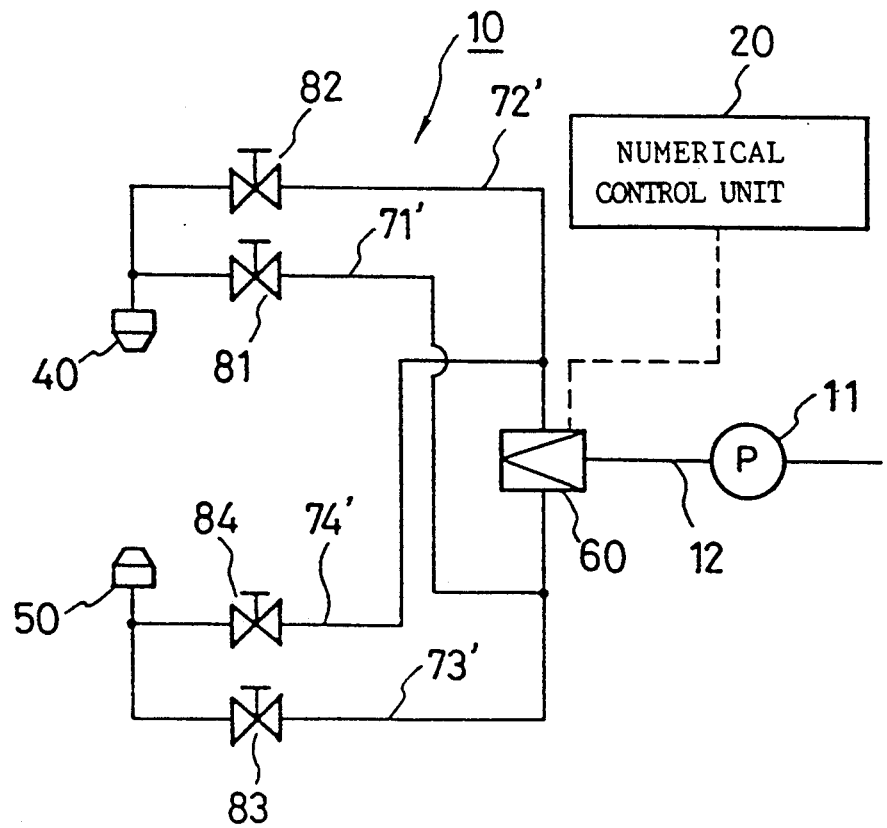
FIG. 4 is a schematic diagram showing a principal part of a wire cut electric discharge machine provided with a machining fluid supply device according to a second embodiment of the present invention.

In FIG. 4, a single three-way selector valve 60 is connected to the numerical control unit 20 and has an inlet port thereof communicated with the main pipe 12. A first outlet port of the selector valve 60 is connected to first and third auxiliary pipes 71' and 73', and a second outlet port of the valve 60 is connected to second and fourth auxiliary pipes 72' and 74'. The operation of the machining fluid supply device shown in FIG. 4 and the wire cut electric discharge machine provided with this device is fundamentally identical to that described with reference to FIG. 1, and accordingly, a description thereof is omitted.

The present invention is not limited to the foregoing first and second embodiments, but various modifications may be made.

For example, although in the first and second embodiments, the manually operated flow regulating valves 81 to 84 are provided, four flow regulating valves each having an actuator operated under the control of the numerical control unit 20 may be disposed in the first to fourth auxiliary pipes 71 to 74, respectively, and their valve openings may be automatically controlled in accordance with the machining program, so as to automatically control the amounts of the machining fluids supplied through the individual auxiliary pipes in accordance with the machining modes. Further, first to fourth auxiliary pipes 71 to 74 having respective required inner diameters and/or a variable delivery pump may be employed for the control of the flow rates of the machining fluid through the individual first to fourth auxiliary pipes. Furthermore, the three-way selector valves 60 to 62 may each be of a manually operated type. Moreover, it is possible to modify the machining fluid supply device of the present invention so as to be adapted for an electric discharge machine which is operable, in addition to the aforesaid two machining modes of cut-out operation and face machining, in some other modes.

I claim:

1. A machining fluid supply device for use with a wire cut electric discharge machine having upper and lower nozzles and adapted to carry out electric discharge in a desired one of a plurality of different machining modes including first and second machining modes, comprising:
    a machining fluid supply source;
    first and second supply lines respectively interposed between said machining fluid supply source and the upper nozzle;
    third and fourth supply lines respectively interposed between said machining fluid supply source and the lower nozzle;
    selector means for selectively permitting supply of machining fluid simultaneously through either said first and third supply lines or said second and fourth supply lines; and
    control means for controlling said selector means;
    wherein, in the first machining mode, the machining fluid is supplied from the upper and lower nozzles through the first and third supply lines at flow rates suited to the first machining mode, and in the second machining mode, the machining fluid is supplied through the second and fourth supply lines at flow rates suited to the second machining mode.

2. A machining fluid supply device according to claim 1, wherein said first and second machining modes are a cut-out operation mode and a face machining mode, respectively.

3. A machining fluid supply device according to claim 1, wherein each of said first to fourth supply lines includes means for individually regulating the amount of the machining fluid supplied therethrough.

4. A machining fluid supply device according to claim 1, wherein said selector means comprises first and second three-way selector valves.

5. A machining fluid supply device according to claim 1, wherein said control means comprises numerical control means.

6. A machining fluid supply device for use with a wire cut electric discharge machine having upper and lower nozzles and adapted to carry out electric discharge in a desired one of a plurality of different machining modes including first and second machining modes, comprising:
    a machining fluid supply source;
    first and second supply lines respectively interposed between said machining fluid supply source and the upper nozzle;
    third and fourth supply lines respectively interposed between said machining fluid supply source and the lower nozzle;
    selector means comprising first and second three-way selector valves for selectively permitting supply of machining fluid simultaneously through either said first and third supply lines or said second and fourth supply lines;
    a flow regulating valve connected to each of said first to fourth supply lines for regulating the amount of machining fluid supplied therethrough;
    control means for controlling said selector means; and wherein, in the first machining mode, the machining fluid is supplied from the upper and lower nozzles through the first and third supply lines at flow rates suited to the first machining mode, and in the second machining mode, the machining fluid is supplied through the second and fourth supply lines at flow rates suited to the second machining mode.

7. A machining fluid supply device according to claim 6 wherein said first and second machining modes are a cut-out operation mode and a face machining mode, respectively.

* * * * *